United States Patent
Huang et al.

(10) Patent No.: US 12,206,475 B2
(45) Date of Patent: Jan. 21, 2025

(54) COMMUNICATION DEVICE AND COMMUNICATION METHOD

(71) Applicant: MEDIATEK INC., Hsinchu (TW)

(72) Inventors: Shao-Yu Huang, Hsinchu (TW);
Chih-Wei Chiu, Hsinchu (TW);
Chih-Wei Lee, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 58 days.

(21) Appl. No.: 18/150,607

(22) Filed: Jan. 5, 2023

(65) Prior Publication Data

US 2023/0261711 A1   Aug. 17, 2023

Related U.S. Application Data

(60) Provisional application No. 63/309,668, filed on Feb. 14, 2022.

(51) Int. Cl.
*H04B 7/06*   (2006.01)
*H04B 7/0456*   (2017.01)

(52) U.S. Cl.
CPC ......... *H04B 7/0617* (2013.01); *H04B 7/0465* (2013.01)

(58) Field of Classification Search
CPC ........ H01Q 1/245; H01Q 3/26; H04B 7/0617; H04B 7/0465
See application file for complete search history.

(56) References Cited

U.S. PATENT DOCUMENTS

| | | |
|---|---|---|
| 2014/0128032 A1 | 5/2014 | Muthukumar |
| 2019/0115657 A1* | 4/2019 | Hwang ................ H04B 7/0802 |
| 2019/0150003 A1* | 5/2019 | He ....................... H04B 7/0617 |
| | | 342/368 |
| 2019/0165486 A1 | 5/2019 | Yoshida |
| 2020/0365969 A1 | 11/2020 | Lee et al. |
| 2021/0068077 A1* | 3/2021 | Raghavan ............ H04B 7/0404 |
| 2021/0175919 A1* | 6/2021 | Badic ................ H04W 72/0446 |
| 2021/0399755 A1 | 12/2021 | Rappaport |

FOREIGN PATENT DOCUMENTS

CN   113890935 A   1/2022

OTHER PUBLICATIONS

Extended European Search Report dated Jun. 19, 2023, issued in application No. EP 23154835.5.
Chinese language office action dated Jul. 28, 2023, issued in application No. TW 112105184.

* cited by examiner

*Primary Examiner* — Dac V Ha
(74) *Attorney, Agent, or Firm* — McClure, Qualey & Rodack, LLP

(57) ABSTRACT

A communication device for detecting an object includes a power module, an antenna array, a first sensor pad, a second sensor pad, and a control unit. The antenna array is excited by the power module, and is configured to provide a first beam group and a second beam group. The first sensor pad is disposed adjacent to the first side of the antenna array. A first capacitance is formed between the first sensor pad and the object. The second sensor pad is disposed adjacent to the second side of the antenna array. A second capacitance is formed between the second sensor pad and the object. The control unit controls the power module according to the first capacitance and the second capacitance, so as to selectively apply at least one power backoff operation to the first beam group and/or the second beam group.

18 Claims, 5 Drawing Sheets

COMMUNICATION DEVICE AND COMMUNICATION METHOD

CROSS REFERENCE TO RELATED APPLICATIONS

This application claims the benefit of U.S. Provisional Application No. 63/309,668, filed on Feb. 14, 2022, the entirety of which is incorporated by reference herein.

BACKGROUND OF THE INVENTION

Field of the Invention

The disclosure generally relates to a communication device, and more specifically, to a communication device and a communication method.

Description of the Related Art

A user may use a mobile phone for browsing or gaming. Thus, the mobile phone should be held in different orientations depending on its use, and this may negatively affect the radiation performance of the antenna element that is disposed in the mobile phone. Accordingly, there is a need to propose a novel solution for solving the problems of the prior art.

BRIEF SUMMARY OF THE INVENTION

In an exemplary embodiment, the disclosure is directed to a communication device for detecting an object. The communication device includes a power module, an antenna array, a first sensor pad, a second sensor pad, and a control unit. The antenna array is excited by the power module, and is configured to provide a first beam group and a second beam group. The first sensor pad is disposed adjacent to the first side of the antenna array. A first capacitance is formed between the first sensor pad and the object. The second sensor pad is disposed adjacent to the second side of the antenna array. A second capacitance is formed between the second sensor pad and the object. The control unit controls the power module according to the first capacitance and the second capacitance, so as to selectively apply at least one power backoff operation to the first beam group and/or the second beam group.

In some embodiments, the communication device is a mobile phone, and the object is a human body.

In some embodiments, the first side and the second side of the antenna array are opposite to each other.

In some embodiments, the antenna array covers a mmWave (Millimeter Wave) frequency band.

In some embodiments, if the first capacitance is greater than a threshold, the control unit will apply the power backoff operation to the first beam group.

In some embodiments, when the power backoff operation is applied to the first beam group, the radiation power of the first beam group is reduced.

In some embodiments, if the second capacitance is greater than a threshold, the control unit will apply the power backoff operation to the second beam group.

In some embodiments, when the power backoff operation is applied to the second beam group, the radiation power of the second beam group is reduced.

In some embodiments, the first distance between the first sensor pad and the first side of the antenna array is shorter than or equal to 20 mm.

In some embodiments, the second distance between the second sensor pad and the second side of the antenna array is shorter than or equal to 20 mm.

In another exemplary embodiment, the invention is directed to a communication method that includes the steps of: exciting an antenna array via a power module and providing a first beam group and a second beam group; disposing a first sensor pad adjacent to a first side of the antenna array, wherein a first capacitance is formed between the first sensor pad and an object; disposing a second sensor pad adjacent to a second side of the antenna array, wherein a second capacitance is formed between the second sensor pad and the object; and controlling the power module according to the first capacitance and the second capacitance, so as to selectively apply at least one power backoff operation to the first beam group and/or the second beam group.

In some embodiments, the communication method further includes: if the first capacitance is greater than a threshold, applying the power backoff operation to the first beam group.

In some embodiments, the communication method further includes: when the power backoff operation is applied to the first beam group, reducing the radiation power of the first beam group.

In some embodiments, the communication method further includes: if the second capacitance is greater than a threshold, applying the power backoff operation to the second beam group.

In some embodiments, the communication method further includes: when the power backoff operation is applied to the second beam group, reducing the radiation power of the second beam group.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
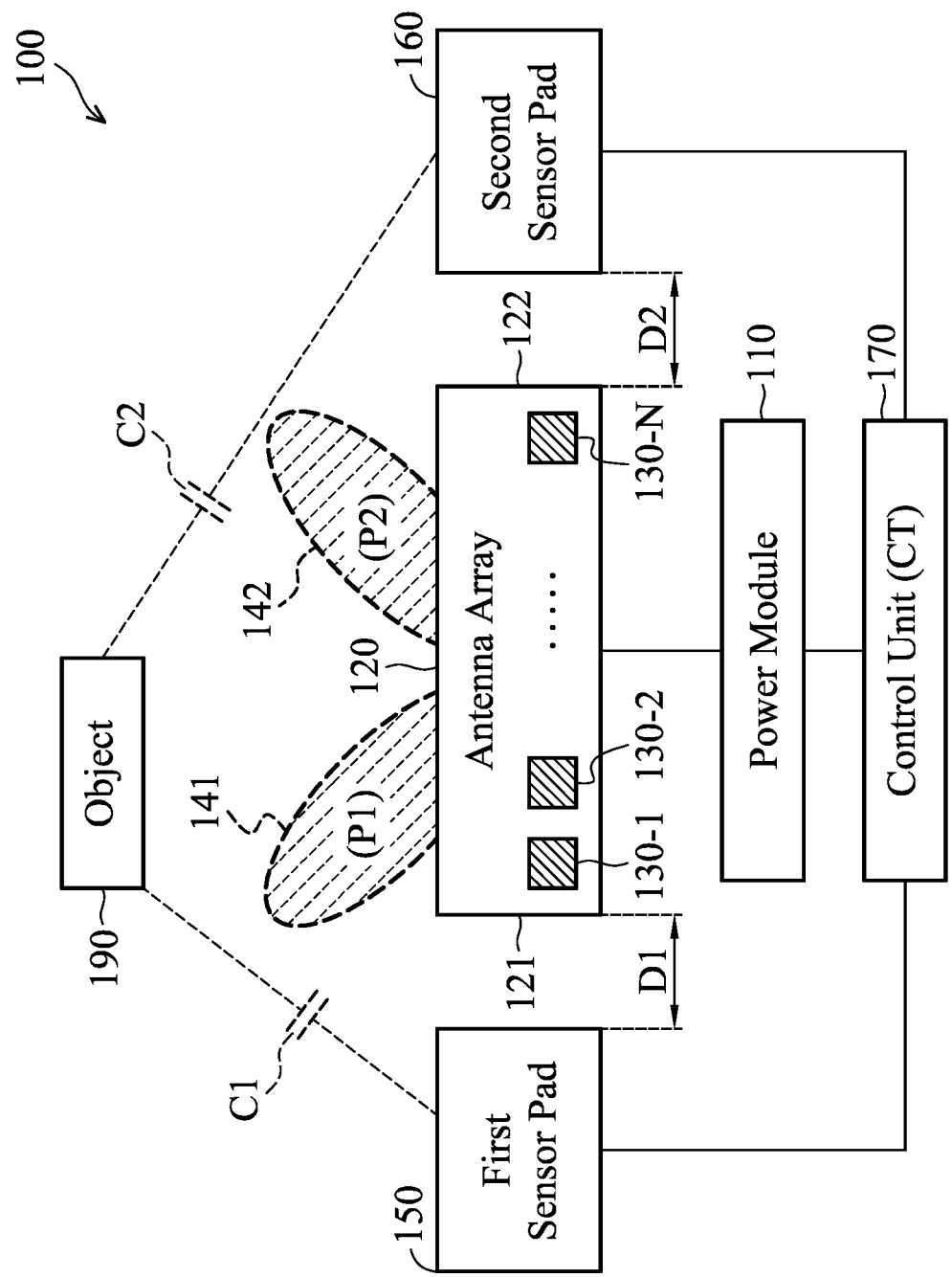
FIG. 1 is a diagram of a communication device according to an embodiment of the invention.

In order to illustrate the purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication device 100 according to an embodiment of the invention. The communication device 100 may be applied to a mobile platform, such as a mobile phone, a tablet computer, or a notebook computer. As shown in FIG. 1, the communication device 100 includes a power module 110, an antenna array 120, a first sensor pad 150, a second sensor pad 160, and a control unit 170. It should be understood that the communication device 100 may include other components, such as a processor, a battery, a touch control panel, and/or a housing, although they are not displayed in FIG. 1.

In some embodiments, the communication device 100 is configured to detect an object 190. For example, the object 190 may be a human body or a conductive element, but it is not limited thereto. It should be noted that the object 190 is not any portion of the communication device 100.

The antenna array 120 can cover a mmWave (Millimeter Wave) frequency band. The antenna array 120 has a first side 121 and the second side 122, which may be opposite to each other. For example, the first side 121 may be the left side of the antenna array 120, and the second side 122 may be the right side of the antenna array 120, but they are not limited thereto. The antenna array 120 is excited by the power module 110, so as to provide a first beam group 141 and a second beam group 142 toward different directions. In some embodiments, each beam group includes one or more radiation beams. In alternative embodiments, the antenna array 120 can provide three or more beam groups in response to different requirements.

The antenna array 120 is disposed between the first sensor pad 150 and the second sensor pad 160. In some embodiments, the antenna array 120 includes a plurality of antenna elements 130-1, 130-2, . . . , and 130-N, and "N" is any positive integer which is greater than or equal to 2. The types and shapes of the antenna elements 130-1, 130-2, . . . , and 130-N are not limited in the invention. For example, any of the antenna elements 130-1, 130-2, . . . , and 130-N may be a monopole antenna, a dipole antenna, a patch antenna, a helical antenna, a hybrid antenna, a chip antenna, or a PIFA (Planar Inverted F Antenna). The power module 110 can supply RF (Radio Frequency) feeding energy and feeding phases to the antenna elements 130-1, 130-2, . . . , and 130-N, and therefore it can control the whole radiation pattern of the antenna array 120.

The first sensor pad 150 is made of a conductive material. The first sensor pad 150 is not limited to any specific type. For example, the first sensor pad 150 may be a single copper piece or an antenna with radiation, such as a monopole antenna or a coupled feed antenna. The first sensor pad 150 is disposed adjacent to the first side 121 of the antenna array 120. A first capacitance C1 is formed between the first sensor pad 150 and the object 190. In some embodiments, if the object 190 is far away from the first sensor pad 150, the first capacitance C1 will be negligible (approaching to 0).

The second sensor pad 160 is made of a conductive material. The second sensor pad 160 is not limited to any specific type. For example, the second sensor pad 160 may be a single copper piece or an antenna with radiation, such as a monopole antenna or a coupled feed antenna. The second sensor pad 160 is disposed adjacent to the second side 122 of the antenna array 120. A second capacitance C2 is formed between the second sensor pad 160 and the object 190. In some embodiments, if the object 190 is very far away from the second sensor pad 160, the second capacitance C2 will be negligible. It should be understood that both the first capacitance C1 and the second capacitance C2 are effective capacitances. There is no lumped capacitor coupled between each sensor pad and the object 190.

It should be noted that the term "adjacent" or "close" over the disclosure means that the distance (spacing) between two corresponding elements is smaller than a predetermined distance (e.g., 30 mm or the shorter), or means that the two corresponding elements directly touch each other (i.e., the aforementioned distance/spacing between them is reduced to 0).

In some embodiments, the first distance D1 between the first sensor pad 150 and the first side 121 of the antenna array 120 is shorter than or equal to 20 mm. In some embodiments, the second distance D2 between the second sensor pad 160 and the second side 122 of the antenna array 120 is shorter than or equal to 20 mm. According to practical measurements, the aforementioned ranges of the first distance D1 and the second distance D2 can help to accurately position the object 190 and suppress the interference with the antenna array 120.

The control unit 170 is respectively coupled to the first sensor pad 150 and the second sensor pad 160. The control unit 170 receives the information of the first capacitance C1 from the first sensor pad 150, and receives the information of the second capacitance C2 from the second sensor pad 160. For example, the aforementioned information may be a voltage, a current, or any signal of other types. The control unit 170 can control the power module 110 according to the first capacitance C1 and the second capacitance C2, so as to selectively apply at least one power backoff operation to the first beam group 141 and/or the second beam group 142.

In some embodiments, if the first capacitance C1 is greater than a threshold CT, it can represent that the object 190 is adjacent to the first sensor pad 150, and the control unit 170 will apply the power backoff operation to the first beam group 141. The threshold CT may be previously determined and stored by the control unit 170. When the power backoff operation is applied to the first beam group 141, the radiation power P1 of the first beam group 141 can be reduced. For example, the power backoff operation may reduce the radiation power P1 of the first beam group 141 by at least 3 dB, but it is not limited thereto.

In some embodiments, if the second capacitance C2 is greater than the threshold CT, it can represent that the object 190 is adjacent to the second sensor pad 160, and the control unit 170 will apply the power backoff operation to the second beam group 142. When the power backoff operation is applied to the second beam group 142, the radiation power P2 of the second beam group 142 can be reduced. For example, the power backoff operation may reduce the radiation power P2 of the second beam group 142 by at least 3 dB, but it is not limited thereto.

With such a design, the control unit 170 can fine-tune the radiation pattern of the antenna array 120 in response to different positions of the object 190, and therefore the whole communication quality of the communication device 100 can be significantly improved.

The following embodiments will introduce a variety of configurations and operations of the communication device 100. It should be understood that these figures and descriptions are merely exemplary, rather than limitations of the invention.

Figure 2A:
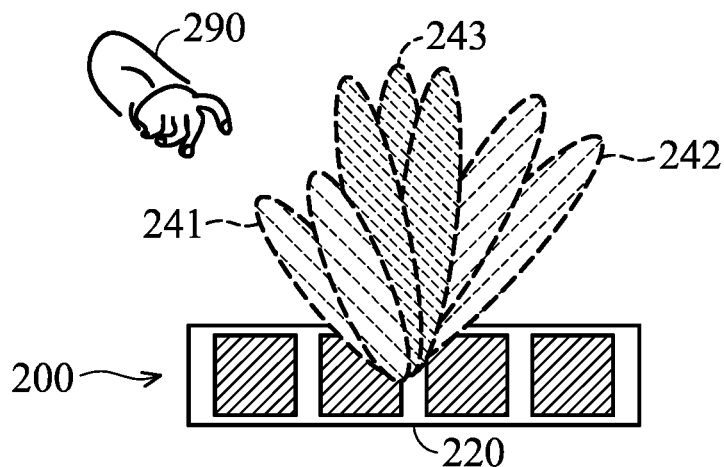
FIG. 2A is a diagram of a communication device modifying its radiation pattern according to an embodiment of the invention.

FIG. 2A is a diagram of a communication device 200 modifying its radiation pattern according to an embodiment of the invention. In the embodiment of FIG. 2A, an antenna array 220 provides a first (left) beam group 241, a second (right) beam group 242, and a third (central) beam group 243. Because a human body 290 (e.g., a hand) is close to the left side of the antenna array 220, a power backoff operation can be applied to the first beam group 241, and the radiation power of the first beam group 241 can be reduced. On the other hand, the radiation power of each of the second beam group 242 and the third beam group 243 may be unchanged or slightly reduced. For example, the radiation power of the first beam group 241 may be about 17 dBm, and the radiation power of each of the second beam group 242 and the third beam group 243 may be about 12 dBm, but they are not limited thereto. It should be understood that the power module, the first sensor pad, the second sensor pad, and the control unit of the communication device 200 are omitted to simplify the figure.

Figure 2B:
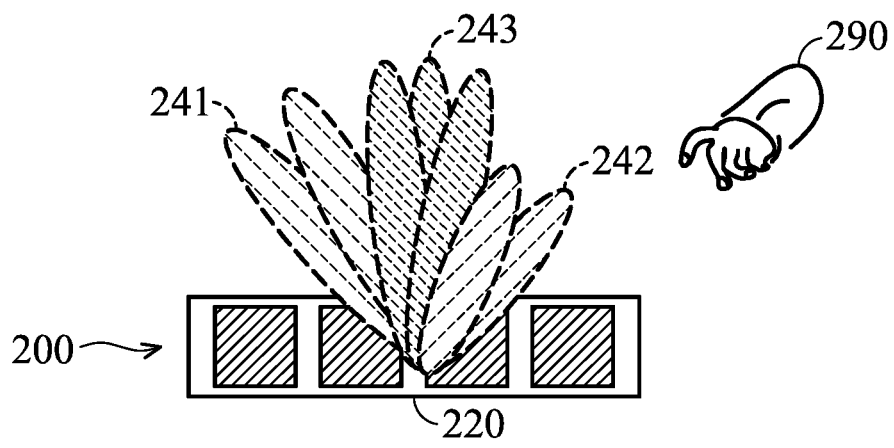
FIG. 2B is a diagram of the communication device modifying its radiation pattern according to another embodiment of the invention.

FIG. 2B is a diagram of the communication device 200 modifying its radiation pattern according to another embodiment of the invention. In the embodiment of FIG. 2B, because the human body 290 is close to the right side of the antenna array 220, the power backoff operation can be applied to the second beam group 242, and the radiation power of the second beam group 242 can be reduced. On the other hand, the radiation power of each of the first beam group 241 and the third beam group 243 may be unchanged or slightly reduced. For example, the radiation power of the second beam group 242 may be about 12 dBm, and the radiation power of each of the first beam group 241 and the third beam group 243 may be about 17 dBm, but they are not limited thereto.

Figure 2C:
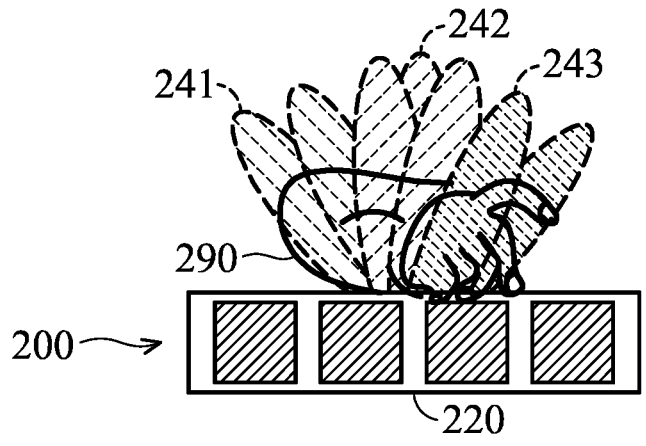
FIG. 2C is a diagram of the communication device modifying its radiation pattern according to another embodiment of the invention.

FIG. 2C is a diagram of the communication device 200 modifying its radiation pattern according to another embodiment of the invention. In the embodiment of FIG. 2C, because the human body 290 directly touches the antenna array 220 (i.e., the worst case), the power backoff operation can be applied to all of the first beam group 241, the second beam group 242 and the third beam group 243, and the radiation power of each of the first beam group 241, the second beam group 242 and the third beam group 243 can be reduced. For example, the radiation power of each of the first beam group 241, the second beam group 242 and the third beam group 243 may be about 12 dBm, but they are not limited thereto.

Figure 3:
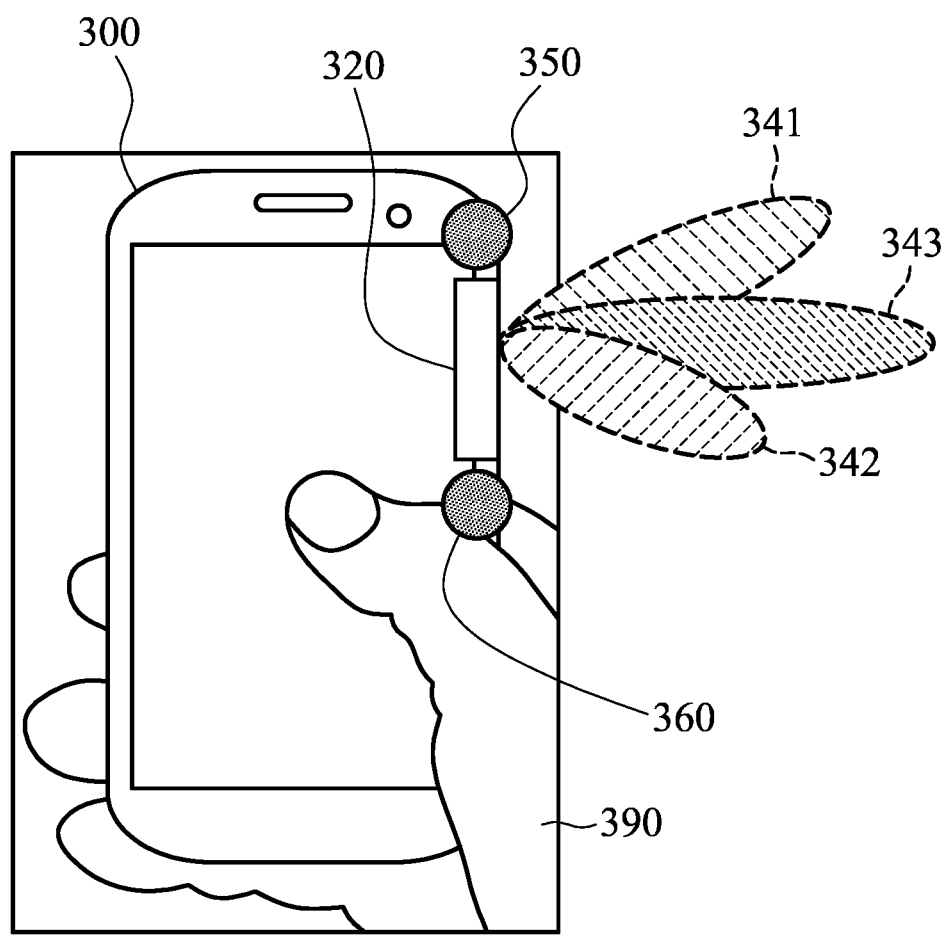
FIG. 3 is a diagram of a communication device according to an embodiment of the invention.

FIG. 3 is a diagram of a communication device 300 according to an embodiment of the invention. The communication device 300 may be a mobile phone. Specifically, the communication device 300 includes an antenna array 320 adjacent to a first sensor pad 350 and a second sensor pad 360. It should be understood that the power module and the control unit of the communication device 300 are omitted to simplify the figure. Similarly, the antenna array 320 provides a first beam group 341, a second beam group 342, and a third beam group 343. In the embodiment of FIG. 3, the communication device 300 is held vertically by a user. For example, the user may use the communication device 300 to browse websites, but it is not limited thereto. Since a hand 390 of the user is close to the second sensor pad 360, a power backoff operation can be applied to the second beam group 342. On the other hand, the radiation power of each of the first beam group 341 and the third beam group 343 are substantially maintained. Therefore, by mainly using the first beam group 341 and the third beam group 343, the communication device 300 can still provide good communication quality.

Figure 4:
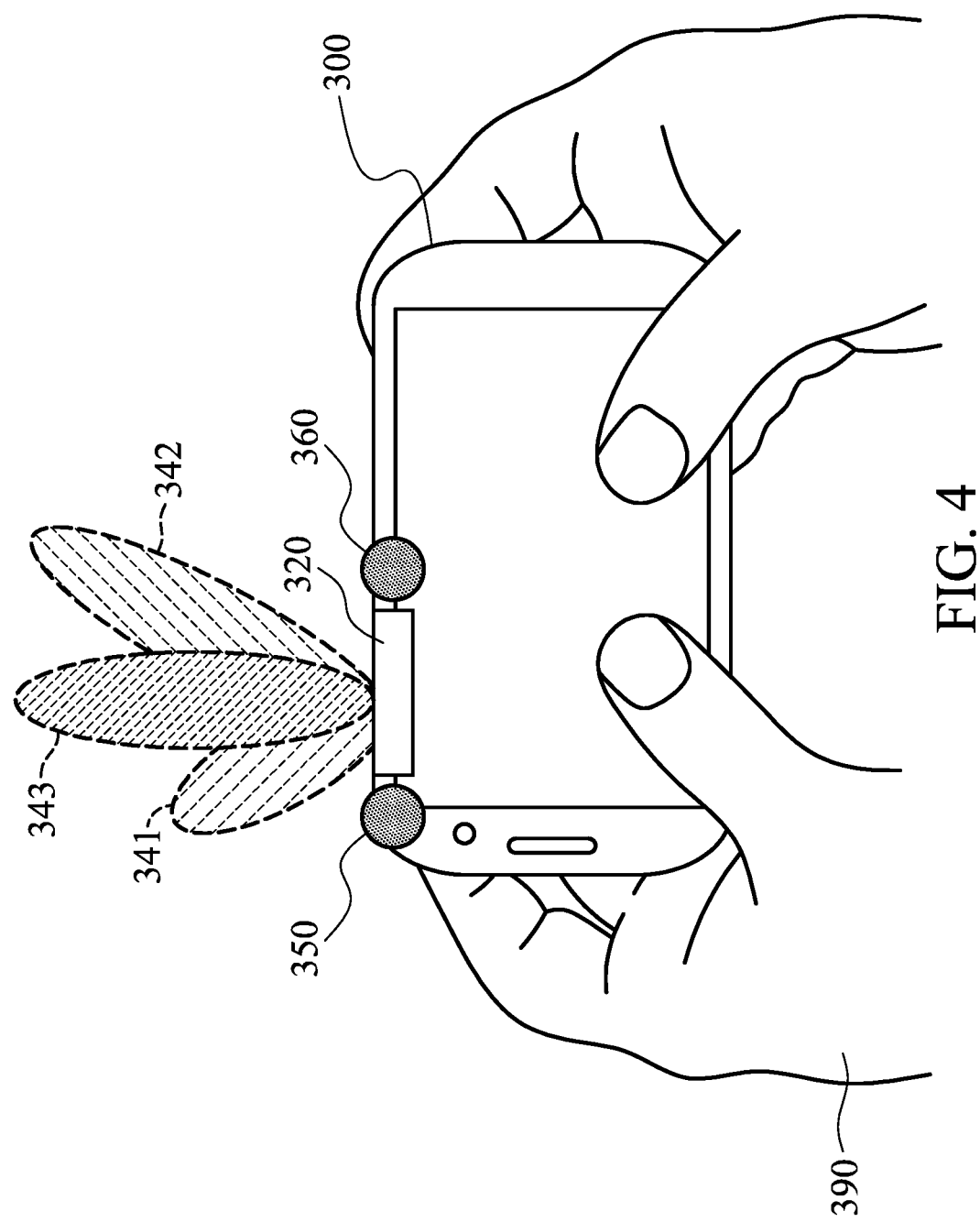
FIG. 4 is a diagram of a communication device according to another embodiment of the invention.

FIG. 4 is a diagram of the communication device 300 according to another embodiment of the invention. In the embodiment of FIG. 4, the communication device 300 is held horizontally by a user. For example, the user may use the communication device 300 to play games, but it is not limited thereto. Since the hand 390 of the user is close to the first sensor pad 350, the power backoff operation can be applied to the first beam group 341. On the other hand, the radiation power of each of the second beam group 342 and the third beam group 343 are substantially maintained. Therefore, by mainly using the second beam group 342 and the third beam group 343, the communication device 300 can still provide good communication quality.

Figure 5:
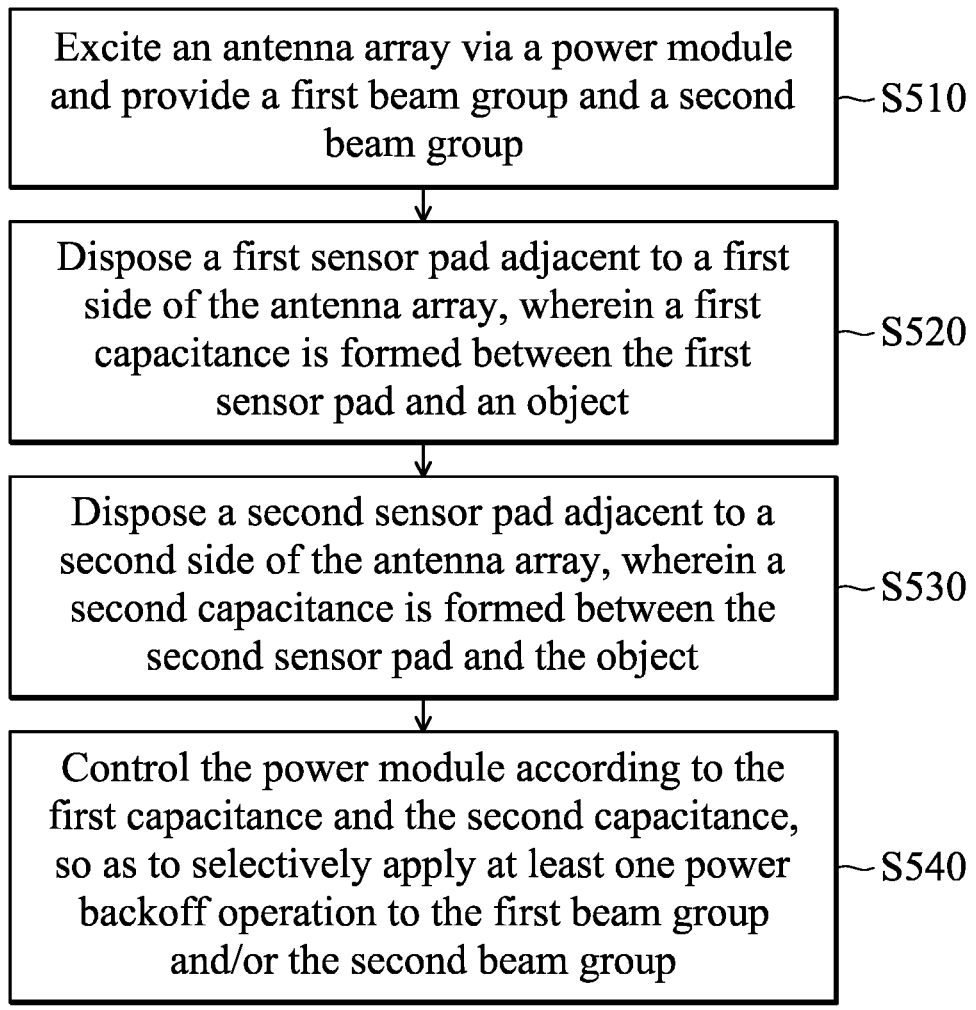
FIG. 5 is a flowchart of a communication method according to an embodiment of the invention.

FIG. 5 is a flowchart of a communication method according to an embodiment of the invention. The aforementioned communication method includes the following steps. In step S510, an antenna array is excited by a power module, so as to provide a first beam group and a second beam group. In step S520, a first sensor pad is disposed adjacent to a first side of the antenna array, and a first capacitance is formed between the first sensor pad and an object. In step S530, a second sensor pad is disposed adjacent to a second side of the antenna array, and a second capacitance is formed between the second sensor pad and the object. In step S540, the power module is controlled according to the first capacitance and the second capacitance, so as to selectively apply at least one power backoff operation to the first beam group and/or the second beam group. It should be noted that the above steps are not required to be performed in order, and all of the features of the embodiments of FIGS. 1 to 4 may be applied to the communication method of FIG. 5.

The invention proposes a novel communication device and a communication method. Compared to the conventional design, the invention has at least the advantages of applying diversity power backoff and improving communication quality, and therefore it is suitable for application in a variety of mobile communication devices.

Note that the above element parameters are not limitations of the invention. A designer can fine-tune these settings or values according to different requirements. It should be understood that the communication device and the communication method of the invention are not limited to the configurations of FIGS. 1-5. The invention may merely include any one or more features of any one or more embodiments of FIGS. 1-5. In other words, not all of the features displayed in the figures should be implemented in the communication device and the communication method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device for detecting an object, comprising:
   a power module;
   an antenna array, excited by the power module, and providing a first beam group and a second beam group;
   a first sensor pad, disposed adjacent to a first side of the antenna array, wherein a first capacitance is formed between the first sensor pad and the object;
   a second sensor pad, disposed adjacent to a second side of the antenna array, wherein a second capacitance is formed between the second sensor pad and the object; and
   a control unit, controlling the power module according to the first capacitance and the second capacitance, so as to selectively apply at least one power backoff operation to the first beam group and/or the second beam group;
   wherein if the first capacitance is greater than a threshold, the control unit applies the power backoff operation to the first beam group.

2. The communication device as claimed in claim 1, wherein the communication device is a mobile phone, and the object is a human body.

3. The communication device as claimed in claim 1, wherein the first side and the second side of the antenna array are opposite to each other.

4. The communication device as claimed in claim 1, wherein the antenna array covers a mmWave (Millimeter Wave) frequency band.

5. The communication device as claimed in claim 1, wherein when the power backoff operation is applied to the first beam group, radiation power of the first beam group is reduced.

6. The communication device as claimed in claim 1, wherein if the second capacitance is greater than a threshold, the control unit applies the power backoff operation to the second beam group.

7. The communication device as claimed in claim 1, wherein when the power backoff operation is applied to the second beam group, radiation power of the second beam group is reduced.

8. The communication device as claimed in claim 1, wherein a first distance between the first sensor pad and the first side of the antenna array is shorter than or equal to 20 mm.

9. The communication device as claimed in claim 1, wherein a second distance between the second sensor pad and the second side of the antenna array is shorter than or equal to 20 mm.

10. A communication method, comprising the steps of:
    exciting an antenna array via a power module and providing a first beam group and a second beam group;
    disposing a first sensor pad adjacent to a first side of the antenna array, wherein a first capacitance is formed between the first sensor pad and an object;
    disposing a second sensor pad adjacent to a second side of the antenna array, wherein a second capacitance is formed between the second sensor pad and the object;
    controlling the power module according to the first capacitance and the second capacitance, so as to selectively apply at least one power backoff operation to the first beam group and/or the second beam group; and
    if the first capacitance is greater than a threshold, applying the power backoff operation to the first beam group.

11. The communication method as claimed in claim 10, wherein the object is a human body.

12. The communication method as claimed in claim 10, wherein the first side and the second side of the antenna array are opposite to each other.

13. The communication method as claimed in claim 10, wherein the antenna array covers a mm Wave frequency band.

14. The communication method as claimed in claim 10, further comprising:
    when the power backoff operation is applied to the first beam group, reducing radiation power of the first beam group.

15. The communication method as claimed in claim 10, further comprising:

if the second capacitance is greater than a threshold, applying the power backoff operation to the second beam group.

16. The communication method as claimed in claim 10, further comprising:

when the power backoff operation is applied to the second beam group, reducing radiation power of the second beam group.

17. The communication method as claimed in claim 10, wherein a first distance between the first sensor pad and the first side of the antenna array is shorter than or equal to 20 mm.

18. The communication method as claimed in claim 10, wherein a second distance between the second sensor pad and the second side of the antenna array is shorter than or equal to 20 mm.

* * * * *